US005260139A

United States Patent [19]

Shiraishi et al.

[11] Patent Number: 5,260,139

[45] Date of Patent: Nov. 9, 1993

[54] THERMAL IMAGE TRANSFER RECORDING MEDIUM

[75] Inventors: Shuhei Shiraishi, Mishima; Shigeyuki Harada, Numazu, both of Japan

[73] Assignee: Ricoh Company, Ltd., Tokyo, Japan

[21] Appl. No.: 614,202

[22] Filed: Nov. 16, 1990

[30] Foreign Application Priority Data

Nov. 21, 1989 [JP] Japan .................................. 1-303969
Jun. 18, 1990 [JP] Japan .................................. 2-159070

[51] Int. Cl.[5] .................................................. B32B 9/00

[52] U.S. Cl. ................................ 428/488.1; 428/195; 428/206; 428/337; 428/409; 428/424.7; 428/484; 428/500; 428/913; 428/914

[58] Field of Search ..................... 428/195, 484, 488.1, 428/488.4, 913, 914, 409, 152, 206, 207, 337, 424.7, 500; 346/76

[56] References Cited

U.S. PATENT DOCUMENTS 4,707,395 11/1987 Ueyama ............................ 428/488.4
4,792,496 12/1988 Koshizuka ........................ 428/488.1

FOREIGN PATENT DOCUMENTS 2-178091 7/1990 Japan .

*Primary Examiner*—Patrick J. Ryan
*Assistant Examiner*—W. Krynske
*Attorney, Agent, or Firm*—Oblon, Spivak, McClelland, Maier & Neustadt

[57] ABSTRACT

A thermal image transfer recording medium is disclosed, which comprises a support; a releasing layer formed on the support, comprising a wax component; and a thermal image transfer layer formed on the releasing layer, comprising a copolymer prepared from an alkylmethacrylate and a (meth)acrylonitrile, optionally in addition thereto a vinyl monomer, with a glass transition temperature of 30° C. or more, and a coloring agent, the thermal image transfer layer having fine cracks having a length of 0.8 to 8 $\mu m$ with the number thereof being 25 to 100 per 1000 $\mu m^2$ on the surface thereof. In this recording medium, the thermal image transfer layer may further comprise a crosslinked acrylic resin with a glass transition temperature of 10° C. or more and a number average molecular weight of 1,000,000 or more. Furthermore, an auxiliary thermal image transfer layer comprising a thermoplastic resin with a glass transition temperature of 30° C. or more may also be interposed between the releasing layer and the thermal image transfer layer.

16 Claims, 1 Drawing Sheet

THERMAL IMAGE TRANSFER RECORDING MEDIUM

BACKGROUND OF THE INVENTION

1. Field of the Invention

This invention relates to a thermal image transfer recording medium which has high thermal sensitivity and can yield images with high heat and abrasion resistances, and more particularly to a thermal image transfer recording medium which is suitable for printing images, for instance, on price tags for textile goods.

2. Discussion of Background

Conventionally known thermal image transfer layers or ink layers of thermal image transfer recording media are, for example, (1) a thermal image transfer layer comprising an emulsified resin with a film-formation initiation temperature of 40° C. or more as disclosed in Japanese Laid-Open Patent Application 63-57679; (2) a thermal image transfer layer comprising as the main component a copolymer of styrene, methylmethacrylate and butylacrylate as disclosed in Japanese Laid-Open Patent Application 62-23779; (3) a thermal image transfer layer or ink layer, formed on a transparent protective layer composed of a styrene-methacrylate copolymer and a polyvinyl chloride resin, comprising a mixture of a styrene-methacrylate copolymer, polymethacrylate, a polyvinyl chloride resin, and a coloring agent as disclosed in Japanese Laid-Open Patent Application 62-179992; and (4) a thermal image transfer recording layer, formed on a transparent protective layer comprising a chlorinated polyolefin resin, comprising a (meth)acrylate polymer and a coloring agent as disclosed in Japanese Laid-Open Patent Application 63-42891.

The conventional thermal image transfer recording media comprising the above thermal image transfer layers cannot necessarily yield images having sufficiently high heat resistance, for instance, for printing images on a price tag for clothing. This is because a price tag for clothing is commonly attached to clothing and is heated together with the clothing when the clothing is hot-pressed, and therefore the images printed on the price tag are blurred by the hot pressing. Moreover, in the course of the hot pressing, the ink of the images stains not only the clothing, but also the price tag itself.

More specifically, resins having a film-formation initiation temperature of 40° C. or more, which are used in the above-described thermal image transfer layer (1), are not necessarily highly heat-resistant. Therefore, the thermal image transfer layer of the recording medium, when used in the form of a rolled ribbon, sticks to the reverse side of the support which is in contact with the thermal image transfer layer in the roll at a temperature of approximately 100° C. In other words, the so-called "blocking" occurs. In addition, the images printed on a price tag attached to the clothing by using the recording medium comprising such a resin are blurred and the price tag sticks to the clothing.

An emulsion of a resin having a high glass transition temperature (Tg), such as a polymethyl methacrylate resin, has a high film-formation initiation temperature. Therefore, a recording medium prepared by using such an emulsion in the image transfer layer cannot exhibit high thermal sensitivity. Moreover, images printed on a price tag attached to clothing by using such a recording medium tends to be blurred, and the ink of the images stains both the clothing and the price tag when the clothing is hot-pressed at a temperature of 180° C. or more. The adhesion of the transferred images to an image receiving sheet is so poor that the printed images easily come off the image receiving sheet when rubbed.

Furthermore, when a wax with a low melting point is used as a binder for the thermal image transfer layer, images printed by the recording medium on the price tag are blurred, and both the clothing and the price tag are stained by the ink of the images when the clothing is hot-pressed. Therefore, such a recording medium is not suitable for printing images on price tags for clothing.

When a resin having a high glass transition temperature (Tg) is incorporated in the thermal image transfer layer of (2), (3) or (4), the thermal sensitivity is decreased although the resistance to hot pressing of the images transferred from the layer onto a price tag attached to clothing is improved. On the other hand, by incorporating a resin having a low glass transition temperature (Tg), the thermal sensitivity can be improved, but if such a resin is incorporated, the resistance to hot pressing is significantly reduced.

In addition, when a protective layer comprising a chlorinated polyolefin is employed, images having high resistance to hot pressing cannot be obtained.

SUMMARY OF THE INVENTION

Accordingly, an object of this invention is to provide a thermal image transfer recording medium with high thermal sensitivity, which can yield images having improved resistance to hot pressing and abrasion.

Another object of this invention is to provide a thermal image transfer recording medium with high preservability even when stored in the form of a rolled ribbon.

The above-mentioned objects of the present invention can be achieved by (1) a thermal image transfer recording medium comprising a support; a releasing layer formed thereon, comprising as the main component a wax component; and a thermal image transfer layer formed on the releasing layer, comprising a copolymer of an alkylmethacrylate and (meth)acrylonitrile with a glass transition temperature (Tg) of 30° C. or more, which thermal image transfer layer may further comprise a crosslinked acrylic resin with a glass transition temperature (Tg) of 10° C. or more and a number average molecular weight of 1,000,000 or more, and a coloring agent, which thermal image transfer layer has on the surface thereof fine cracks having a length of 0.8 to 8 μm with the number thereof being 25 to 100 per 1000 $\mu m^2$; or (2) a thermal image transfer recording medium comprising a support; a releasing layer formed thereon, comprising as the main component a wax component; an auxiliary thermal image transfer layer formed on the releasing layer, which auxiliary thermal image transfer layer is substantially colorless and comprises as the main component a thermoplsatic resin with a glass transition temperature (Tg) of 30° C. or more; and a thermal image transfer layer formed on the auxiliary thermal image transfer layer, comprising a copolymer of an alkylmethacrylate and (meth)acrylonitrile with a glass transition temperature (Tg) of 30° C. or more, which thermal image transfer layer may further comprise a cross-linked acrylic resin with a glass transition temperature (Tg) of 10° C. or more and a number average molecular weight of 1,000,000 or more, and a coloring agent, which thermal image transfer layer has on the surface thereof fine cracks having a length of 0.8 to 8 μm with the number thereof being 25 to 100 per 1000 $\mu m^2$.

BRIEF DESCRIPTION OF THE DRAWING

In the drawing,

FIGURE is a photograph showing the fine cracks of a thermal image transfer layer of a thermal image transfer recording medium according to the present invention.

DETAILED DESCRIPTION OF THE PREFERRED EMBODIMENTS

Figure 1:
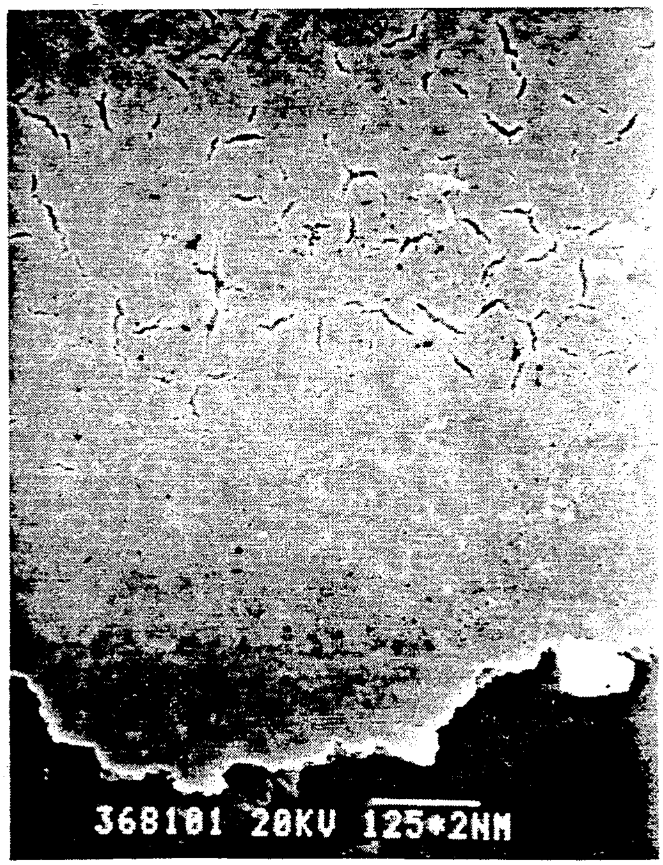

Since the thermal image transfer layer of the thermal image transfer recording medium according to the present invention has fine cracks having a length of 0.8 to 8 μm with the number thereof being 25 to 100 per 1000 $\mu m^2$ on the surface thereof, it can yield images with high resistances to hot pressing, to abrasion and to scratch. In addition, the preservability of the thermal image transfer recording medium according to the present invention is improved when stored in the form of a rolled ribbon. In order to obtain these advantages as well as high resolution, and to prevent the thermal image transfer layer from easily coming off the releasing layer or auxiliary layer or an image receiving sheet when the thermal image transfer layer is transferred imagewise, it is preferable that the thermal image transfer layer have cracks with a length of 1.5 to 3.5 μm, and the number of the cracks be 40 to 70 per 1000 $\mu m^2$.

To form the fine cracks in the thermal image transfer layer of the thermal image transfer recording medium according to the present invention, a coating liquid containing at least a copolymer of an alkylmethacrylate and (meth)acrylonitrile and a coloring agent is coated on a support and dried at or above the glass transition temperature of the above copolymer. Alternatively, the coated surface of the thermal image transfer layer may be dried and subjected to a heat-treatment at or above the glass transition temperature of the above copolymer, followed by cooling the thermal image transfer layer to room temperature to shrink the copolymer, whereby the fine cracks are caused to spread in the thermal image transfer layer.

The fine cracks in the thermal image transfer layer of the recording medium can easily be observed by a scanning-type electron microscope as shown in a photograph of FIGURE.

Examples of the materials for the support of the thermal image transfer recording medium according to the present invention include plastics films such as a polyester film, a polycarbonate film, a polyimide film, aromatic polyamide films, a polyether ether ketone film, and a polysulfone film. It is preferable that the thickness of the support be about 3 to 10 μm.

In the present invention, a releasing layer is formed on the support. The releasing layer comprises a wax component, preferably with a melting point or softening point in the range of 70° to 120° C.

Examples of the above-mentioned wax component contained in the releasing layer include carnauba wax, montan wax, ozocerite, microcrystalline wax, rice bran wax, ceresine wax, paraffin wax, polyethylene wax, sazole wax and hardened castor oil.

The thickness of the releasing layer is preferably 0.1 to 3 μm. For the formation of the releasing layer on the support, the hot-melt method or coating method using water or an organic solvent is employed.

Because of the presence of the releasing layer, the image transfer efficiency at the time of thermal image transfer recording is improved, and clear images are obtained. Moreover, because of the presence of the rcleasing layer, a wax film layer is formed on the surface of the printed images when the thermal image transfer layer is transferred to an image receiving sheet, so that high hot-pressing resistance and abrasion resistance are imparted to the printed images. Furthermore, once the printed images are transferred to an image receiving sheet, they are not retransferred to other materials even if they are brought into contact with other materials.

In the present invention, when the melting point or softening point of the wax component used in the releasing layer is in the range of 70° to 120° C., the thermal energy applied to the recording medium for thermal image transfer recording is not wasted for melting the wax component. Thus, the image transfer efficiency is maintained high. Moreover, the releasability of the releasing layer by which the thermal image transfer layer is released from the releasing is adequate to carry out smooth thermal image transfer.

As previously mentioned, the thermal image transfer layer of the thermal image transfer recording medium of the present invention comprises at least a copolymer prepared from a group of copolymerizable components comprising an alkylmethacrylate and (meth)acrylonitrile, with a glass transition temperature of 30° C. or more, and a coloring agent.

The above-mentioned copolymer can be obtained, for example, by polymerization of an alkylmethacrylate and (meth)acrylonitrile. Specific examples of the alkylmethacrylate include methyl methacrylate, ethyl methacrylate, propyl methacrylate and butyl methacrylate. When this copolymer is prepared, a vinyl monomer may be further employed as an additional copolymerizable component.

In the present invention, since the glass transition temperature of the above copolymer contained in the thermal image transfer layer is 30° C. or more, the film-forming properties of the copolymer are excellent, so that the obtained images are sharp and have high resolution.

In the present invention, the thermal image transfer layer may further comprise a crosslinked acrylic resin, such as a crosslinked acrylate resin, with a glass transition temperature of 10° C. or more, preferably with a glass transition temperature of 15° to 20° C., and a number average molecular weight of 1,000,000 or more. Commercially available examples of such a crosslinked acrylic resin include "LA443A2" (Trademark) (Tg: 16° C., Mn: 1,000,000 or more), "LA443A3" (Trademark) (Tg: 20° C., Mn: 1,000,000 or more), and "LA443B2" (Trademark) (Tg: 16° C., Mn: 1,000,000 or more) (made by Hoechst Gosei K.K.).

Examples of the coloring agent used in the thermal image transfer layer include pigments and dyes such as carbon black, red iron oxide, Lake Red C, Fast Sky Blue, Benzidine Yellow, Phthalocyanine Green, Phthalocyanine Blue, direct dyes, oil-soluble dyes, and basic dyes.

The amount of the coloring agent is preferably about 10 to 20 wt. % of the total weight of the thermal image transfer layer.

The thermal image transfer layer can be prepared by dissolving or dispersing the above copolymer and coloring agent in water or a solvent to prepare a thermal image transfer layer formation liquid, coating this liquid on the releasing layer or the auxiliary layer and drying the same. The thickness of the thermal image transfer layer is preferably in the range of about 1 to 3 μm.

As previously mentioned, the thermal image transfer recording medium according to the present invention may further comprise an auxiliary thermal image transfer layer between the releasing layer and the thermal image transfer layer. The auxiliary thermal image transfer layer is substantially colorless and comprises as the main component a thermoplastic resin with a glass transition temperature (Tg) of 30° C. or more.

Examples of the above-mentioned thermoplastic resin for the auxiliary thermal image transfer layer include polymers of methyl methacrylate, ethyl methacrylate, n-propyl methacrylate, acrylic acid, methacrylic acid, styrene, α-methylstyrene, acrylonitrile, methacrylonitrile, vinyl chloride, vinyl formal, and vinyl acetal; copolymers of the above monomers; and copolymers of the above monomers and other monomers such as vinyl acetate, acrylic acid and ethylene.

The auxiliary thermal image transfer layer can be formed by dissolving or dispersing the above-mentioned thermoplastic resin in water or a solvent to prepare a solution or dispersion, coating the solution or dispersion onto the surface of the releasing layer, and drying the same. The thickness of the auxiliary thermal image transfer layer is preferably in the range of about 0.2 to 2 μm.

In the present invention, a lubricant may be incorporated into at least the releasing layer of the two layers, the releasing layer and the auxiliary layer. Namely the auxiliary thermal image transfer layer may also comprise a lubricant in addition to the releasing layer. Preferable examples of the lubricant for use in the present invention include inorganic lubricants, and organic lubricants having a melting point of 140° C. or more.

Specific examples of the inorganic lubricants include talc, mica powder, molybdenum disulfide and graphite, preferably having an average particle size of 0.1 to 5 μm, which is preferably incorporated in an amount of 5 to 20 wt. % of the total weight of the layer into which the inorganic lubricant is incorporated.

Examples of the organic lubricants having a melting point of 140° C. or more include metal soaps such as lithium stearate, magnesium stearate, calcium stearate, strontium stearate, barium stearate, calcium laurate, barium laurate, lithium 12-hydroxystearate, calcium 12-hydroxystearate and lead dibasic stearate; N-substituted fatty acid amides such as N,N'-ethylene-bis-12-hydroxystearic acid amide, N,N'-ethylene-bislauric acid amide, N,N'-methylene-bisstearic acid amide, N,N'-hexamethylene-bisstearic acid amide, N,N'-hexamethylene-bisoleic acid amide, N,N'-distearyladipic acid amide, and N,N'-distearylterephthalic acid amide; polytetrafluoroethylene; and a silicone resin.

The incorporation amount of the organic lubricant is preferably in the range of 1 to 10 wt. % of the total weight of the layer. The organic lubricant can be incorporated into the releasing layer and/or the auxiliary thermal image transfer layer by dissolving it into a mixture for forming the thermal image transfer layer, or dispersing finely-divided particles of the lubricant having a diameter of 0.1 to 5 μm in the mixture.

Other features of this invention will become apparent in the course of the following description of exemplary embodiments, which are given for illustration of the invention and are not intended to be limiting thereof.

EXAMPLE 1

Formation of Releasing Layer

The following components were dispersed in a ball mill for 24 hours to prepare a releasing layer formation liquid:

| | Parts by Weight |
|---|---|
| Carnauba wax | 10 |
| Toluene | 90 |

The above prepared releasing layer formation liquid was coated onto the surface of a polyester film support having a thickness of 4.5 μm and dried, so that a releasing layer with a thickness of 2 μm was formed on the support.

Formation of Thermal Image Transfer Layer

A mixture with the following formulation was coated onto the above releasing layer and dried at 80° C., whereby a thermal image transfer layer with a thickness of 2 μm was formed on the releasing layer:

| | Parts by Weight |
|---|---|
| Emulsion of ethyl methacrylate - acrylonitrile copolymer (Tg: 70° C., Solid component: 50%) | 80 |
| Dispersion of carbon black | 20 |

Thus, thermal image transfer recording medium No. 1 according to the present invention was prepared.

EXAMPLE 2

Formation of Releasing Layer

A mixture of the following components was heated to a temperature of 120° C. to form a melted mixture. The melted mixture was coated onto the surface of a polyester film support having a thickness of 4.5 μm by the hot-melt coating method, so that a releasing layer with a thickness of 1 μm was formed on the support:

| | Parts by Weight |
|---|---|
| Carnauba wax | 10 |
| Ethylene - vinyl acetate copolymer | 10 |

Formation of Thermal Image Transfer Layer

A mixture having the following formulation was coated onto the above releasing layer and dried at 60° C., whereby a thermal image transfer layer with a thickness of 2 μm was formed on the releasing layer:

| | Parts by Weight |
|---|---|
| Emulsion of n-butyl methacrylate - acrylonitrile copolymer (Tg: 50° C., Solid component: 50%) | 80 |
| Dispersion of carbon black | 20 |

Thus, thermal image transfer recording medium No. 2 according to the present invention was prepared.

EXAMPLE 3

Formation of Releasing Layer

A mixture of the following components was heated to a temperature of 120° C. to form a melted mixture. The melted mixture was coated onto the surface of a polyester film support having a thickness of 4.5 μm by the hot-melt coating method, so that a releasing layer with a thickness of 1 μm was formed on the support:

| | Parts by Weight |
|---|---|
| Carnauba wax | 90 |
| Ethylene - vinyl acetate copolymer | 10 |

Formation of Auxiliary Thermal Image Transfer Layer

A mixture with the following formulation was coated onto the above releasing layer and dried at 50° C., whereby an auxiliary thermal image transfer layer with a thickness of 0.5 μm was formed on the releasing layer:

| | Parts by Weight |
|---|---|
| Emulsion of n-butyl methacrylate - acrylonitrile copolymer (Tg: 50° C., Solid component: 50%) | 20 |
| n-butanol | 10 |
| Water | 70 |

Formation of Thermal Image Transfer Layer

A mixture with the following formulation was coated onto the above auxiliary thermal image transfer layer and dried at 60° C., whereby a thermal image transfer layer with a thickness of 1.5 μm was formed on the auxiliary thermal image transfer layer:

| | Parts by Weight |
|---|---|
| Emulsion of n-butyl methacrylate - acrylonitrile copolymer (Tg: 50° C., Solid component: 50%) | 70 |
| Dispersion of carbon black | 30 |

Thus, thermal image transfer recording medium No. 3 according to the present invention was prepared.

EXAMPLE 4

The procedure for preparation of the thermal image transfer recording medium No. 3 in Example 3 was repeated except that the formulation for the auxiliary thermal image transfer layer employed in Example 3 was replaced by the following formulation, so that thermal image transfer recording medium No. 4 according to the present invention was prepared.

Formulation of Auxiliary Thermal Image Transfer Layer

| | Parts by Weight |
|---|---|
| Emulsion of n-butyl methacrylate - acrylonitrile copolymer (Tg: 30° C., Solid component: 50%) | 20 |
| n-butanol | 10 |

-continued

| | Parts by Weight |
|---|---|
| Water | 70 |

EXAMPLE 5

The procedure for preparation of the thermal image transfer recording medium No. 3 in Example 3 was repeated except that the formulation for the thermal image transfer layer employed in Example 3 was replaced by the following formulation, so that thermal image transfer recording medium No. 5 according to the present invention was prepared.

Formulation of Thermal Image Transfer Layer

| | Parts by Weight |
|---|---|
| Emulsion of n-butyl methacrylate - acrylonitrile - ethylacrylate (Tg: 40° C., Solid component: 50%) | 60 |
| Emulsion of polyester (Tg: 10° C., Solid component: 30%) | 10 |
| Dispersion of carbon black | 30 |

EXAMPLE 6

The procedure for preparation of the thermal image transfer recording medium No. 3 in Example 3 was repeated except that the formulation for the thermal image transfer layer employed in Example 3 was replaced by the following formulation, so that thermal image transfer recording medium No. 6 according to the present invention was prepared.

Formulation of Thermal Image Transfer Layer

| | Parts by Weight |
|---|---|
| Emulsion of methyl methacrylate - n-butyl methacrylate - acrylonitrile copolymer (Tg: 50° C., Solid component: 50%) | 55 |
| Emulsion of vinyl acetate - ethylacrylate copolymer (Tg: 20° C., Solid component: 50%) | 15 |
| Dispersion of carbon black | 30 |

EXAMPLE 7

Formation of Releasing Layer

The following components were dispersed in a ball mill for 24 hours to prepare a releasing layer formation liquid:

| | Parts by Weight |
|---|---|
| Carnauba wax | 10 |
| Toluene | 90 |

The above prepared releasing layer formation liquid was coated onto the surface of a polyester film support having a thickness of 4.5 μm and dried, so that a releasing layer with a thickness of 2 μm was formed on the support.

Formation of Thermal Image Transfer Layer

A mixture with the following formulation was coated onto the above releasing layer and dried at 80° C., whereby a thermal image transfer layer with a thickness of 2 μm was formed on the releasing layer.

| | Parts by Weight |
|---|---|
| Emulsion of ethyl methacrylate - acrylonitrile copolymer (Tg: 70° C., Solid component: 50%) | 60 |
| Crosslinked acrylic resin "LA443A2" (Trademark), made by Hoechst Gosei K.K. (Tg: 16° C., Solid component: 30%) | 20 |
| Dispersion of carbon black | 20 |

Thus, thermal image transfer recording medium No. 7 according to the present invention was prepared.

EXAMPLE 8

Formation of Releasing Layer

A mixture of the following components was heated to a temperature of 120° C. to prepare a melted mixture. This melted mixture was coated onto the surface of a polyester film support with a thickness of 4.5 μm by the hot-melt coating method, so that a releasing layer with a thickness of 1 μm was formed on the support.

| | Parts by Weight |
|---|---|
| Canauba wax | 90 |
| Ethylene - vinyl acetate copolymer | 10 |

Formation of Thermal Image Transfer Layer

A mixture with the following formulation was coated onto the above releasing layer and dried at 60° C., whereby a thermal image transfer layer with a thickness of 2 μm was formed on the releasing layer.

| | Parts by Weight |
|---|---|
| Emulsion of n-butyl methacrylate - acrylonitrile copolymer (Tg: 50° C., Solid component: 50%) | 70 |
| Crosslinked acrylic resin "LA443A2" (Trademark), made by Hoechst Gosei K.K. (Tg: 20° C., Solid component: 30%) | 10 |
| Dispersion of carbon black | 20 |

Thus, thermal image transfer recording medium No. 8 according to the present invention was prepared.

EXAMPLE 9

Formation of Releasing Layer

The following components were dispersed in a ball mill for 24 hours to prepare a releasing layer formation liquid:

| | Parts by Weight |
|---|---|
| Carnauba wax | 10 |
| Toluene | 90 |

The above prepared releasing layer formation liquid was coated onto the surface of a polyester film support with a thickness of 4.5 μm and dried, so that a releasing layer with a thickness of 2 μm was formed on the support.

Formation of Auxiliary Thermal Image Transfer Layer

A mixture with the following formulation was coated onto the above releasing layer and dried at 50° C., whereby an auxiliary thermal image transfer layer with a thickness of 0.5 μm was formed on the releasing layer:

| | Parts by Weight |
|---|---|
| Emulsion of n-butyl methacrylate - acrylonitrile copolymer (Tg: 50° C., Solid component: 50%) | 20 |
| n-butanol | 10 |
| Water | 70 |

Formation of Thermal Image Transfer Layer

A mixture with the following formulation was coated onto the above auxiliary thermal image transfer layer and dried at 60° C., whereby a thermal image transfer layer with a thickness of 1.5 μm was formed on the auxiliary thermal image transfer layer:

| | Parts by Weight |
|---|---|
| Emulsion of n-butyl methacrylate - acrylonitrile copolymer (Tg: 50° C., Solid component: 50%) | 70 |
| Crosslinked acrylic resin "LA443B2" (Trademark), made by Hoechst Gosei K.K. (Tg: 16° C., Solid component: 30%) | 10 |
| Dispersion of carbon black | 20 |

Thus, thermal image transfer recording medium No. 9 according to the present invention was prepared.

EXAMPLE 10

The procedure for preparation of the thermal image transfer recording medium No. 9 in Example 9 was repeated except that the formulation for the auxiliary thermal image transfer layer employed in Example 9 was replaced by the following formulation, so that thermal image transfer recording medium No. 10 according to the present invention was prepared.

Formulation of Auxiliary Thermal Image Transfer Layer

| | Parts by Weight |
|---|---|
| Emulsion of n-butyl methacrylate - acrylonitrile copolymer (Tg: 30° C., Solid component: 50%) | 20 |
| n-butanol | 10 |
| Water | 70 |

EXAMPLE 11

The procedure for preparation of the thermal image transfer recording medium No. 9 in Example 9 was repeated except that the formulation for the thermal image transfer layer employed in Example 9 was replaced by the following formulation, so that thermal image transfer recording medium No. 11 according to the present invention was prepared.

Formulation of Thermal Image Transfer Layer

| | Parts by Weight |
|---|---|
| Emulsion of ethyl methacrylate - acrylonitrile - ethylacrylate copolymer (Tg: 40° C., Solid component: 50%) | 60 |
| Crosslinked acrylic resin "LA443A2" (Trademark), made by Hoechst Gosei K.K. (Tg: 16° C., Solid component: 30%) | 10 |
| Dispersion of carbon black | 30 |

EXAMPLE 12

The procedure for preparation of the thermal image transfer recording medium No. 9 in Example 9 was repeated except that the formulation for the thermal image transfer layer employed in Example 9 was replaced by the following formulation, so that thermal image transfer recording medium No. 12 according to the present invention was prepared.

Formulation of Thermal Image Transfer Layer

| | Parts by Weight |
|---|---|
| Emulsion of methyl methacrylate - n-butyl methacrylate - acrylonitrile copolymer (Tg: 50° C., Solid component: 50%) | 55 |
| Crosslinked acrylic resin "LA443A3" (Trademark), made by Hoechst Gosei K.K. (Tg: 20° C., Solid component: 30%) | 15 |
| Dispersion of carbon black | 30 |

COMPARATIVE EXAMPLE 1

The procedure for preparation of the thermal image transfer recording medium No. 1 in Example 1 was repeated except that the temperature at which the thermal image transfer layer was dried was changed to 50° C., so that comparative thermal image transfer recording medium No. 1 was prepared.

COMPARATIVE EXAMPLE 2

The procedure for preparation of the thermal image transfer recording medium No. 3 in Example 3 was repeated except that the formulation for the auxiliary thermal image transfer layer employed in Example 3 was replaced by the following formulation, so that comparative thermal image transfer recording medium No. 2 was prepared.

Formulation of Auxiliary Thermal Image Transfer Layer

| | Parts by Weight |
|---|---|
| Emulsion of n-butyl methacrylate (Tg: 20° C., Solid component: 50%) | 20 |
| n-butanol | 10 |
| Water | 70 |

COMPARATIVE EXAMPLE 3

The procedure for preparation of the thermal image transfer recording medium No. 3 in Example 3 was repeated except that the formulation for the thermal image transfer layer employed in Example 3 was replaced by the following formulation, so that comparative thermal image transfer recording medium No. 3 was prepared.

Formulation of Thermal Image Transfer Layer

| | Parts by Weight |
|---|---|
| Emulsion of n-butyl methacrylate (Tg: 40° C., Solid component: 50%) | 60 |
| Emulsion of ethyl methacrylate - ethylacrylate copolymer (Tg: 20° C., Solid component: 50%) | 10 |
| Dispersion of carbon black | 30 |

A stick-preventing layer with a thickness of 0.1 μm was provided on the opposite side of the support to the thermal image transfer layer of each of the thermal image transfer recording media Nos. 1 to 6 according to the present invention and the comparative thermal image transfer recording media Nos. 1 to 3.

More specifically, a liquid with the following formulation was coated onto the above-mentioned opposite side of the support of the recording medium, and then dried.

| | Parts by Weight |
|---|---|
| 30% toluene solution of silicone rubber | 10 |
| Toluene | 90 |
| Hardening agent | 0.1 |

Images were transferred onto an image receiving sheet from each of the above-prepared thermal image transfer recording media by using a thermal image transfer printer with a line-type thermal head. The image receiving sheet was a sheet of coated paper having a smoothness of 1000 seconds, and a thermal energy of 10 to 25 $mJ/mm^2$ was applied to each recording medium. The obtained printed samples were subjected to the following evaluation tests:

1. Hot Pressing Test

This test was carried out as follows in accordance with JIS L 0850.

A piece of well dried white cotton cloth was overlaid on each of the samples. An electric smoothing iron heated to a temperature of 200° C. was placed on the white cotton cloth for 15 seconds. The pressure applied by the electric smoothing iron was approximately 25 $g/cm^2$.

Thereafter, the white cotton cloth was peeled off the sample, and the images transferred onto the image receiving sheet was visually inspected as to whether or not they were blurred, and as to whether or not they were transferred to the surface of the white cloth. The results are shown in Table 1.

2. Abrasion Test

This test was carried out as follows in accordance with JIS L 0849. Each of the printed samples was rubbed by a piece of well dried white cotton cloth by using a crockmeter. The rubbing was repeated 10 times reciprocatingly. Thereafter, the images on the image receiving sheet was visually inspected whether or not they were transferred to the surface of the white cloth. The results are shown in Table 1.

3. Scratch Test

The test was carried out by rubbing each of the samples by pencils with different hardness with the load of about 1 t/cm$^2$ applied thereto. The scratch resistance of images was expressed by the hardness of a pencil with which the images were peeled off the image receiving sheet. The results are shown in Table 1.

4. Preservability Test

Each of the recording media in the form of a rolled ribbon was preserved at 50° C. for 24 hours, and then visually inspected as to whether or not blocking occurred in the roll of the recording medium.

In addition, after each thermal image transfer recording medium was stored at 50° C. for 24 hours, images were transferred onto the image receiving sheet from the thermal image transfer recording medium by using the aforementioned thermal image transfer printer and the above-mentioned abrasion test was performed. The results are shown in Table 1.

Moreover, the surface of each thermal image transfer recording medium was observed by a scanning type electron microscope to confirm the presence of the fine cracks.

TABLE 1

| Recording | | | | | | F | | |
|---|---|---|---|---|---|---|---|---|
| Medium | A | B | C | D | E | F-1 | F-2 | G |
| No. 1 | 15 | ○ | ○ | ○ | H | ○ | ○ | present |
| No. 2 | 14 | ○ | ○ | ○ | 2H | ○ | ○ | present |
| No. 3 | 16 | ○ | ○ | ○ | 4H | ○ | ○ | present |
| No. 4 | 15 | ○ | ○ | ○ | 4H | ○ | ○ | present |
| No. 5 | 15 | ○ | ○ | ○ | 4H | ○ | ○ | present |
| No. 6 | 15 | ○ | ○ | ○ | 4H | ○ | ○ | present |
| No. 7 | 16 | ○ | ○ | ○ | 2H | ○ | ○ | present |
| No. 8 | 25 | ○ | ○ | ○ | 2H | ○ | ○ | present |
| No. 9 | 16 | ○ | ○ | ○ | 4H | ○ | ○ | present |
| No. 10 | 15 | ○ | ○ | ○ | 4H | ○ | ○ | present |
| No. 11 | 15 | ○ | ○ | ○ | 4H | ○ | ○ | present |
| No. 12 | 15 | ○ | ○ | ○ | 4H | ○ | ○ | present |
| Comp. No. 1 | 16 | X | X | ○ | HB | ○ | X | * |
| Comp. No. 2 | 15 | X | X | ○ | 2H | X | ○ | absent |
| Comp. No. 3 | 15 | X | X | ○ | 2H | X | ○ | absent |

In the above table, A, B, C, D, E, F, F-1, F-2, and G respectively denote as follows:
A : Thermal sensitivity (mJ/mm$^2$)
B : Clearness of images printed on image receiving sheet
○ : images with good solid areas and clear-cut lines without blur.
X : images with poor solid areas and non-clear-cut lines with blur.
C : Resistance to hot pressing
○ : images underwent no changes.
X : images were blurred, and largely transferred to the white cloth.
D : Abrasion resistance
○ : images underwent no changes and did not stain the white cloth.
E : Scratch resistance, which is expressed by the hardness of a pencil at which the transferred images were peeled off the image receiving sheet
F : Preservability
F-1 : Blocking resistance
○ : no blocking was observed.
X : blocking was observed.
F-2 : Abrasion resistance after storage
○ : images underwent no changes and did not stain the white cloth.
X : images stained the white cloth.
G : Fine cracks in the thermal image transfer layer
*In Comparative Example No. 2, the surface was studed with resin particles, without cracks.

The data shown in the above table clearly demonstrate that the thermal image transfer recording media according to the present invention have high hot pressing resistance, abrasion resistance and scratch resistance and show excellent preservability. In particular when the auxiliary thermal image transfer layer is included, the hot pressing resistance and scratch resistance are significantly improved, because the transferred image is protected by the auxiliary thermal image transfer layer.

What is claimed is:

1. A thermal image transfer recording medium comprising:

a support;

a releasing layer formed on said support, comprising a wax component; and a thermal image transfer layer formed on said releasing layer, comprising a copolymer prepared from a group of copolymerizable components comprising an alkylmethacrylate and an acrylonitrile or methacrylonitrile, with a glass transition temperature of at least 30° C., and a coloring agent, said thermal image transfer layer having fine cracks having a length of 0.8 to 8 μm with the number thereof being 25 to 100 per 1000 μm$^2$ on the surface thereof.

2. The thermal image transfer recording medium as claimed in claim 1, wherein said thermal image transfer layer further comprises a crosslinked acrylic resin with a glass transition temperature of at least 10° C. and a number average molecular weight of at least 1,000,000.

3. The thermal image transfer recording medium as claimed in claim 1, wherein said wax component contained in said releasing layer has a melting point or softening point of 70° to 120° C.

4. The thermal image transfer recording medium as claimed in claim 3, wherein said wax component contained in said releasing layer is selected from the group consisting of carnauba wax, montan wax, ozocerite, microcrystalline wax, rice bran wax, ceresine wax, paraffin wax, polyethylene wax, sazole wax, and hardened castor oil.

5. The thermal image transfer recording medium as claimed in claim 1, wherein said releasing layer has a thickness of 0.1 μm to 3 μm.

6. The thermal image transfer recording medium as claimed in claim 1, wherein said alkylmethacrylate is selected from the group consisting of methyl methacrylate, ethyl methacrylate, propyl methacrylate and butyl methacrylate.

7. The thermal image transfer recording medium as claimed in claim 1, wherein said coloring agent in said thermal image transfer layer is selected from the group consisting of carbon black, red iron oxide, Lake Red C, Fast Sky Blue, Benzidine Yellow, Phthalocyanine Green and Phthalocyanine Blue.

8. The thermal image transfer recording medium as claimed in claim 1, wherein the amount of said coloring agent is 10 wt. % to 20 wt. % of the total weight of said thermal image transfer layer.

9. The thermal image transfer recording medium as claimed in claim 1, wherein said thermal image transfer layer has a thickness of 1 μm to 3 μm.

10. The thermal image transfer recording medium as claimed in claim 1, wherein said releasing layer further comprises a lubricant.

11. The thermal image transfer recording medium as claimed in claim 10, wherein said lubricant is an inorganic lubricant selected from the group consisting of talc, mica powder, molybdenum disulfide and graphite.

12. The thermal image transfer recording medium as claimed in claim 11, wherein said inorganic lubricant has an average particle size of 0.1 μm to 5 μm.

13. The thermal image transfer recording medium as claimed in claim 10, wherein said lubricant is an organic lubricant having a melting point of at least 140° C., selected from the group consisting of lithium stearate, magnesium stearate, calcium stearate, strontium stearate, barium stearate, calcium laurate, barium laurate, lithium 12-hydroxystearate, calcium 12-hydroxystearate, zinc dibasic stearate, N,N'-ethylene-bis-12-hydroxystearic acid amide, N,N'-ethylene-bislauric acid amide, N,N'-methylene-bisstearic acid amide, N,N'-hexamethylene-bisstearic acid amide, N,N'-hexamethylene-bisoleic acid amide, N,N'-distearyladipic acid amide, N,N'-distearylterephthalic acid amide, polytetrafluoroethylene, and a silicone resin.

14. The thermal image transfer recording medium as claimed in claim 13, wherein the amount of said organic lubricant is 1 wt. % to 10 wt. % of the total weight of said releasing layer.

15. The thermal image transfer recording medium as claimed in claim 1, wherein said support has a thickness of 3 μm to 10 μm.

16. The thermal image transfer recording medium as claimed in claim 1, wherein said coloring agent in said thermal transfer layer is selected from the group consisting of direct dyes, oil-soluble dyes and basic dyes.

* * * * *

UNITED STATES PATENT AND TRADEMARK OFFICE

CERTIFICATE OF CORRECTION

PATENT NO. : 5,260,139
DATED : November 9, 1993
INVENTOR(S) : Shuhei Shiraishi, et. al.

It is certified that error appears in the above-indentified patent and that said Letters Patent is hereby corrected as shown below:

Column 6, Line 48, "Carnauba wax 10" should read --Carnauba wax 90--

Column 13, Line 36, "No. 8 25" should read --No. 8 15--

Column 13, Line 59, "surface was studed" should read --surface was studded--

Signed and Sealed this

Thirteenth Day of December, 1994

Attest:

BRUCE LEHMAN

Attesting Officer

*Commissioner of Patents and Trademarks*